United States Patent
Whitcomb

(10) Patent No.: US 12,420,176 B2
(45) Date of Patent: Sep. 23, 2025

(54) SYSTEMS AND METHODS FOR A MICROPHONE INPUT DEVICE AND MICROPHONE ACCESSIBILITY FEATURES

(71) Applicant: Sony Interactive Entertainment LLC, San Mateo, CA (US)

(72) Inventor: Sean Whitcomb, Seattle, WA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 316 days.

(21) Appl. No.: 18/157,220

(22) Filed: Jan. 20, 2023

(65) Prior Publication Data
US 2024/0245987 A1 Jul. 25, 2024

(51) Int. Cl.
| | | |
|---|---|---|
| *A63F 13/215* | (2014.01) | |
| *A63F 13/285* | (2014.01) | |
| *A63F 13/814* | (2014.01) | |
| *G10H 1/00* | (2006.01) | |

(52) U.S. Cl.
CPC .......... *A63F 13/215* (2014.09); *A63F 13/285* (2014.09); *A63F 13/814* (2014.09); *G10H 1/0008* (2013.01); *G10H 2210/066* (2013.01); *G10H 2210/071* (2013.01); *G10H 2210/076* (2013.01)

(58) Field of Classification Search
CPC ..... A63F 13/215; A63F 13/285; A63F 13/814
See application file for complete search history.

(56) References Cited

U.S. PATENT DOCUMENTS

| | | | |
|---|---|---|---|
| 6,520,776 B1 * | 2/2003 | Furukawa | H04R 3/00 |
| | | | 84/610 |
| 8,237,041 B1 * | 8/2012 | McCauley | G10H 1/0091 |
| | | | 84/610 |

(Continued)

OTHER PUBLICATIONS ir.corsair.com [online], "Sound You Can Feel—CORSAIR Launches HS60 Haptic Gaming Headset," Oct. 15, 2020, retrieved on Jan. 7, 2025, retrieved from URL<https://ir.corsair.com/news-releases/news-release-details/sound-you-can-feel-corsair-launches-hs60-haptic-gaming-headset>, 5 pages.

(Continued)

*Primary Examiner* — David L Lewis
*Assistant Examiner* — Shauna-Kay Hall
(74) *Attorney, Agent, or Firm* — Fish & Richardson P.C.

(57) ABSTRACT

Systems, processes and device configurations are provided for microphone input devices. A microphone input device can include a plurality of feedback elements positioned along a body and a controller to control the plurality of feedback elements based on feedback from a gaming device. The controller can detect voice input, communicate voice input to the gaming device, and receive feedback for control of the plurality of feedback elements to communicate how well the user is performing. Similarly, the microphone input device may provide haptic feedback in the form of aiding or providing hints for a user. Feedback and haptic output to a user may improve the accessibility of users for gaming devices and singing applications. Processes are provided for controlling a microphone input device including control of feedback elements in response to one or more of voice input, media and a gaming device.

20 Claims, 4 Drawing Sheets

(56) References Cited

U.S. PATENT DOCUMENTS

| | | | |
|---|---|---|---|
| 8,380,119 B2* | 2/2013 | Rubio | G10H 1/0008 |
| | | | 434/308 |
| 8,485,903 B2* | 7/2013 | Woolston | A63F 13/211 |
| | | | 463/37 |
| 9,743,204 B1* | 8/2017 | Welch | G01S 3/803 |
| 2007/0242040 A1 | 10/2007 | Ullrich et al. | |
| 2007/0256545 A1 | 11/2007 | Lee et al. | |
| 2008/0300054 A1* | 12/2008 | Munshi | A63F 13/245 |
| | | | 463/37 |
| 2010/0248832 A1* | 9/2010 | Esaki | A63F 13/814 |
| | | | 463/31 |
| 2017/0017331 A1* | 1/2017 | Huang | A63F 13/218 |
| 2019/0147841 A1* | 5/2019 | Zatepyakin | G10H 1/368 |
| | | | 352/12 |
| 2021/0219039 A1 | 7/2021 | Robateau | |
| 2022/0180767 A1 | 6/2022 | Aharonson et al. | |

OTHER PUBLICATIONS

International Search Report dated Apr. 10, 2024 in International Application No. PCT/US2024/012207.
Written Opinion dated Apr. 10, 2024 in International Application No. PCT/US2024/012207.

* cited by examiner

SYSTEMS AND METHODS FOR A MICROPHONE INPUT DEVICE AND MICROPHONE ACCESSIBILITY FEATURES

FIELD

The present disclosure is directed to input devices and microphones for interactive entertainment, electronic games and singing applications The disclosure is also directed to microphone input devices, processes for microphone feedback, gaming device configurations, gaming device controls, and gaming device communication.

BACKGROUND

Computer and console games often receive input from control devices. For singing games, the input device often includes a one-way microphone device communicating in one direction with a base. Many singing games provide feedback by way of a display. Some users, especially with vision impairment, may have difficulty viewing the feedback. For singing applications and interactive entertainment, such as karaoke, many systems do not provide any feedback to a user. There exists a desire for feedback to users for both console games and singing devices in general. There also exists a need to improve game and singing game accessibility for users and a desire to increase engagement with games and game systems.

BRIEF SUMMARY OF THE EMBODIMENTS

Disclosed and described herein are systems, methods and configurations for a microphone input device and microphone input device accessibility. In one embodiment, a microphone input device includes a transducer element, a body and a plurality of feedback elements, wherein the each of the plurality of feedback elements are positioned along the body. The microphone input device also includes a controller coupled to the transducer element and the plurality of feedback elements. The controller is configured to detect voice input to the transducer element, communicate the voice input to a gaming device, and receive feedback from the gaming device. The controller is also configured to control activation of at least one of the plurality of feedback elements based on feedback from the gaming device.

In one embodiment, the plurality of feedback elements include haptic transducers configured to vibrate, and wherein the controller is configured to activate each feedback element independently.

In one embodiment, the plurality of feedback elements include haptic elements with a ring structure, wherein each feedback element is spaced apart along the body and each feedback element shares a center axis with the body.

In one embodiment, the voice input is detected for at least one of a singing game and singing device.

In one embodiment, the feedback is a rating of the voice input to at least one of a pitch, rhythm and timing of media of the gaming device.

In one embodiment, the at least one of the plurality of feedback elements is activated to indicate an incorrect pitch.

In one embodiment, the at least one of the plurality of feedback elements is activated to indicate at least one of an incorrect rhythm and timing of the voice input.

In one embodiment, the controller is configured to receive a cue for at least one of pitch, timing and rhythm from the gaming device.

According to another embodiment, a method is provided for controlling a microphone input device. The method includes detecting, by a controller of a microphone input device, a voice input to a transducer element of the microphone input device, and communicating, by the controller, the voice input to a gaming device. The method also includes receiving, by the controller, feedback from the gaming device, and controlling, by the controller, activation of at least one of a plurality of feedback elements based on feedback from the gaming device.

In one embodiment, the voice input is detected for at least one of a singing game and singing device.

In one embodiment, the feedback is a rating of the voice input to at least one of a pitch, rhythm and timing of media of the gaming device.

In one embodiment, the at least one of the plurality of feedback elements is activated to indicate an incorrect pitch.

In one embodiment, the at least one of the plurality of feedback elements is activated to indicate at least one of an incorrect rhythm and timing of the voice input.

In one embodiment, the method includes receiving, by the controller, a cue for at least one of pitch, timing and rhythm from the gaming device.

Another embodiment is directed to a system. The system includes gaming device and a microphone input device including a transducer element, a plurality of feedback elements and a controller. The controller is configured to detect voice input to a transducer element, communicate the voice input to the gaming device and receive feedback from the gaming device. The controller is also configured to control activation of at least one of the plurality of feedback elements based on feedback from the gaming device.

In one embodiment, the plurality of feedback elements include haptic transducers configured to vibrate.

In one embodiment, a plurality of feedback elements, wherein the each of the plurality of feedback elements are positioned along the body.

In one embodiment, the at least one of the plurality of feedback elements is activated to indicate one or more of an incorrect pitch, an incorrect rhythm and timing of the voice input.

In one embodiment, the controller is configured to receive a cue for at least one of pitch, timing and rhythm from the gaming device.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1:
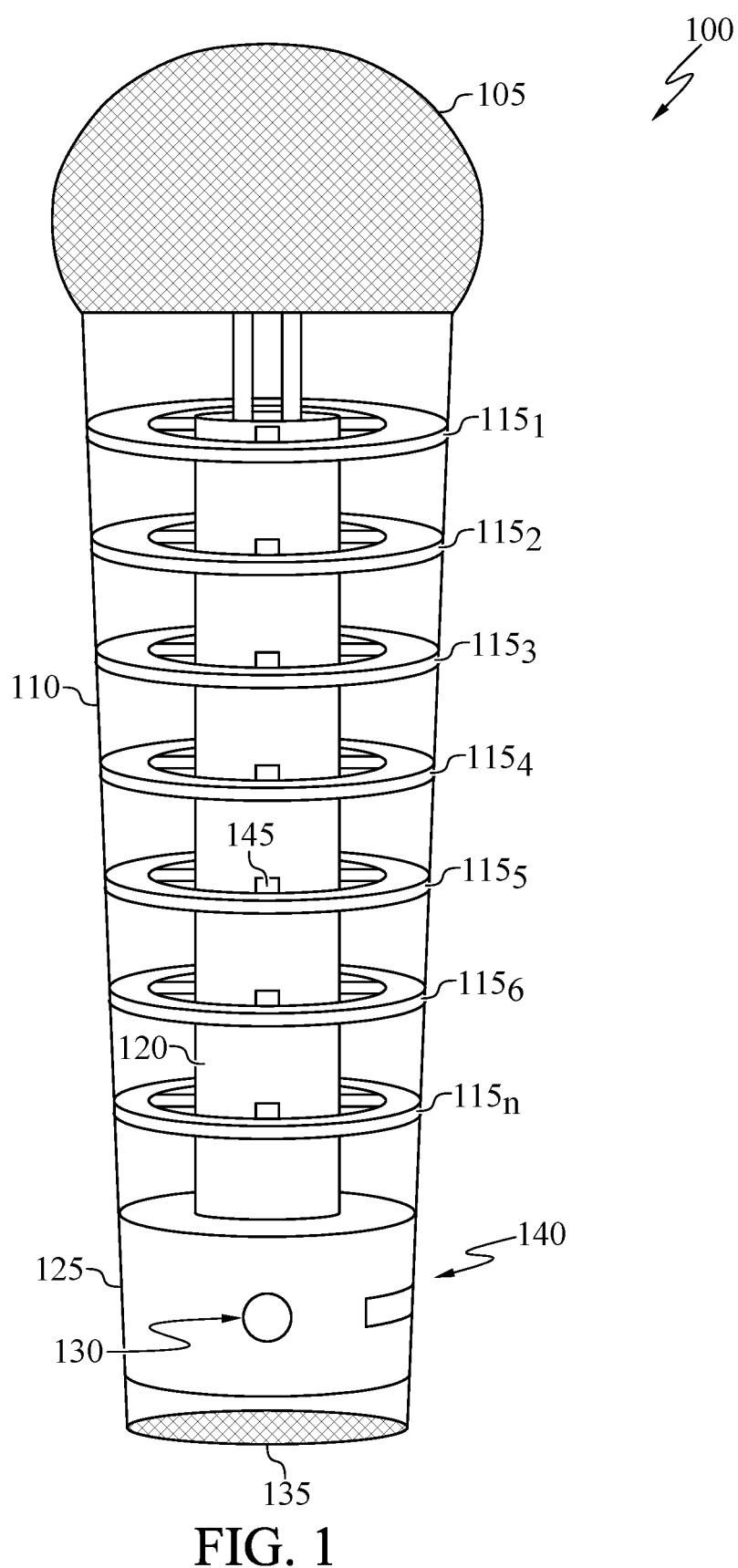
FIG. 1 is a graphical representation of microphone input device according to one or more embodiments.

One aspect of the disclosure is directed to devices for providing assistance for interactive entertainment including gaming devices, gaming media, singing games, and performance media. Embodiments are directed to systems, devices and methods for providing assistance, such as feedback and cues, by way of a microphone input device. Gaming systems may include consoles or devices that play game media, consoles that provide network data for games, handheld devices, mobile devices (e.g., tablets, mobile phones, etc.) and devices in general configured for electronic gaming. Gaming systems may be applications on mobile devices and tablets. Gaming systems and devices may also receive controls and interact with users by way of control devices. According to embodiments, a microphone input device is provided having a plurality of feedback elements for providing one or more of feedback and cues to a user. Microphone input devices may include a transducer for detecting sound and for interaction with the gaming device or system. Gaming systems and devices may be integrated with or coupled to a display device that may provide graphical feedback to a user. A microphone input device may provide haptic or touch feedback. References to feedback may include haptic response to a user and may also include haptic cues to a user independent and/or prior to detection of voice input.

According to embodiments, a microphone input device can include a plurality of feedback elements controlled to provide one or more of feedback, cues and accessibility features to a user. Unlike game controllers with haptic elements that vibrate a controller as a whole, at least one of the structure, location and control of the feedback elements can provide feedback to a user to indicate one or more of tone, timing, rhythm and a rating of voice for a game title, singing game and singing application (e.g., karaoke, etc.).

Embodiments are also directed to processes for control of a microphone input device. A controller of the microphone input device may control feedback elements independently to activate one or more feedback elements at a time. Processes may include generating feedback for a microphone input device. Processes may also include generating cues or hints to aid a user in performing or meeting game and/or performance tasks. Embodiments are also directed to systems including a gaming device operating with a microphone input device for operation of a game, a performance (e.g., singing, dancing, moving, etc.) and gameplay in general.

Although device configurations, systems and processes are discusses with respect to gaming applications, such as singing games and interactive entertainment, it should be appreciated that the principles of the disclosure may be applied to microphones and input devices in general and interactive entertainment media in general.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Figure 3:
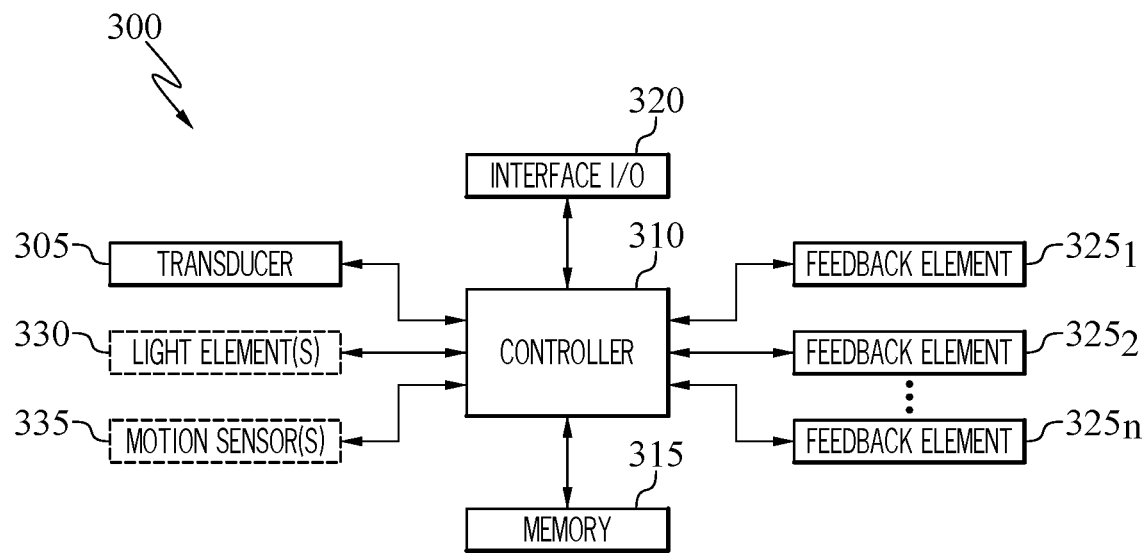
FIG. 3 illustrates a device configuration according to one or more embodiments.

FIG. 1 is a graphical representation of microphone input device according to one or more embodiments. According to embodiments, microphone input device 100 is configured to detect voice and/or vocal inputs for use with interactive entertainment and provide at least one of feedback and sensory cues to a user by way of a plurality of feedback elements in the body of the microphone input device. According to embodiments, microphone input device 100 includes a transducer element 105, body 110 and plurality of feedback elements $115_{1-n}$. Microphone input device 100 may be configured as a haptic feedback microphone such that activation of one more of feedback elements $115_{1-n}$ may provide one or more of cues and feedback to a user. Microphone input device 100 may include one or more elements to provide feedback and to communicate with an interactive entertainment system, such as a gamine device, singing device and/or display device. FIG. 3, for example, provides a representation of components and configurations that may be employed by microphone input device 100. FIG. 5, for example, provides an illustration of feedback element activation and control.

According to embodiments, transducer element 105 of microphone input device 100 is configured to detect acoustic inputs such as voice. Transducer element 105 may be one or more of a dynamic microphone, condenser microphone and sound detector in general. Microphone input device 100 may include a metal grill encapsulating the transducer element 105. Transducer element 105 may be supported by body 110, which may act as a grip or handle for microphone input device 100. Body 110 includes an outer surface and body 110 houses components of microphone input device 100.

According to embodiments, microphone input device 100 includes a plurality of feedback elements $115_{1-n}$ to provide haptic feedback and cues. According to embodiments, feedback elements $115_{1-n}$ are positioned along the body 110. Each feedback element may be spaced apart from each other and may be mounted to support 120. Support 120 may be an internal shaft or support configured to retain feedback elements $115_{1-n}$. Feedback elements $115_{1-n}$ may be controlled to vibrate and/or provide haptic feedback to a user holding microphone input device 100, such as a user gripping body 110. According to embodiments, feedback elements $115_{1-n}$ may have a ring structure and connect to support 120 to receive power and activation signals. By way of example, each of feedback elements $115_{1-n}$ may include a round or circular structure, the outer surface of which contacts with, is flush with, raised from or lowered from the outer surface of body 110. Vibration duration and intensity may be controlled for each of feedback elements $115_{1-n}$. Feedback elements $115_{1-n}$ may be encapsulated by body 110, mounted flush with the surface of body 110, or raised partially from body 110. Body 110 may include a slightly dented or deformed surface for each feedback element location. Feedback elements 115$_{1-n}$ may have a ring structure. Body 110 may also include placement of one or more lighted elements, such as lighted element 145 which may be activated in coordination with output of feedback elements 115$_{1-n}$. Microphone input device 100 may include a plurality of light elements in body 110 (e.g., the handle), where illumination of the lighted element may replicate or be based on on-screen elements of a game.

According to embodiments, microphone input device 100 includes a plurality of feedback elements 115$_{1-n}$ configured to provide a haptic grip. Feedback elements 115$_{1-n}$ may be configured to vibrate and provide a user with a sensation that varies in duration and intensity. Feedback elements 115$_{1-n}$ may accommodate human hands of different shapes and sizes by control and selection of feedback elements 115$_{1-n}$. Feedback elements 115$_{1-n}$ may be controlled to provide haptic feedback in a way that can be experienced throughout body 110, which may be a microphone handle. According to embodiments, microphone input device 100 may be configured to provide at least one accessibility feature, including a haptic feedback microphone configuration to allow a user to feel music beats. For singing games that rely on visual cues to inform the player how close they match pitch and beat, microphone input device can also provide haptic cues and feedback. For example, microphone input device 100 can provide sensory cues via haptic feedback. By way of example, feedback elements 115$_{1-n}$ may be configured to provide haptic feedback or vibrations of one or more durations and intensity to replicate musical beats with precision. Output of feedback elements 115$_{1-n}$ may be powered by a centralized power core of support 120. During operation, multiple rings of feedback elements 115$_{1-n}$ may send signals which may be felt by a user's hand. As a result, microphone input device 100 may provide a player who is legally blind or has low vision with essential gameplay cues by mimicking the beat of music or increasing/decreasing intensity of vibration based on player performance. Haptic feedback by microphone input device 100 may also improve the sensory experience of all players who enjoy singing games. Cues may assist players without accessibility issues receive additional feedback.

According to embodiments, microphone input device 100 may include one or more features to aid in providing feedback to a user. Unlike a single vibration area or pair of vibration elements a game input device, microphone input device 100 may be configured for entertainment (e.g., singing, dancing moving) or voice input entertainment such that feedback elements 115$_{1-n}$ may be configured to provide feedback or cues to match the same tone, pitch and timing. Feedback elements 115$_{1-n}$ may be activated in coordination to indicate timing for a pitch or a pitch hold of vocal input. Light intensity of lighted elements, such as lighted element 145, may also be controlled. Body 110 may include a grip configured to allow for providing feedback and sensation. For example, body 110 may include a rubberized surface or grip over a hard shell. Alternatively, body 110 may include a hard shell with feedback elements 115$_{1-n}$ internal to the hard shell.

According to embodiments, microphone input device 100 may be self-contained, and can be configured to communicate with an interactive entertainment device, such as a gaming console, media player or display, by sending and receiving signals over one or more of wired and wireless communication. Microphone input device 100 may include one or more features to allow for use with an interactive entertainment device. Microphone input device 100 may include chargeable base 125 to act as a power source or battery of microphone input device 100. Chargeable base 125 may be charged with either a base or a charging cord. Microphone input device 100 may include power switch 130 to act as a power button for turning microphone input device 100 on and off. Microphone input device 100 may also include vent 135 for cooling and port 140, which may be a plug or port to receive power from a power source. Microphone input device 100 may be configured to be charged in a cradle.

FIG. 1, illustrates one or more features of microphone input device 100. Microphone input device 100 may include one or more additional elements, such as features described in FIG. 3 and herein, and may also be operated using one or more processes described herein. Microphone input device 100 may also be configured as a game controller and may communicate with one or more of an interactive entertainment device, display and gaming console for one or more of gaming, and use with karaoke devices/machines. In addition to singing games, microphone input device 100 may be a game controller in general for games and communicate with a one or more of a gaming console and other gaming controllers.

Figure 2:
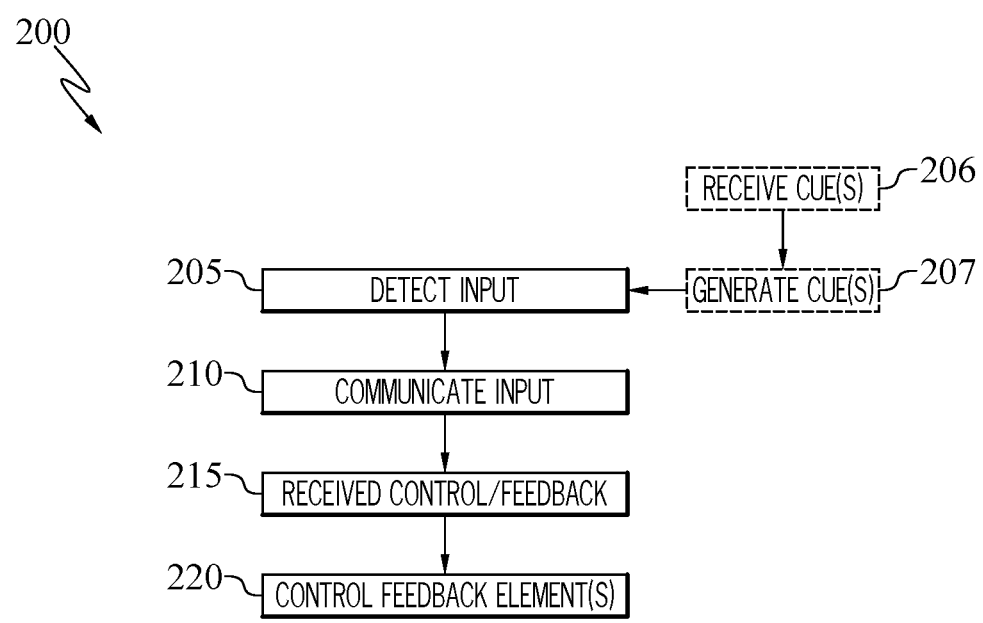
FIG. 2 illustrates a process for input device control according to one or more embodiments.

FIG. 2 illustrates a process for input device control according to one or more embodiments. According to embodiments, processes are provided for interactive entertainment device input devices, such as microphone input device 100. Process 200 may be utilized for control of microphone input device 100. Process 200 may be performed by a device, such as device 300 and/or controller 310 of FIG. 3. Process 200 may be utilized for a system, such as the system of FIG. 4 discussed herein. Process 200 may provide at least one of feedback and cues to a user by way of haptic feedback using a microphone input device.

Process 200 may be initiated by a device detecting input at block 205. According to embodiments, input detected at block 205 may be input to a microphone device, such as user voice and/or voice input. A voice input to a transducer element of the microphone input device may be detected by a controller of a microphone input device at block 205. The input may include voice input generated by the user. At block 210, process 200 may include a controller communicating the detected input to an interactive entertainment device, such as a gaming unit, gaming console, display running a singing application, karaoke device, etc. The controller may communicate by wired and/or wireless transmission of the voice input in real time. With wireless transmission, the controller may include timing information such as a clock or synchronization element associated with detection of the voice input. Voice input may be detected at block 205 for a singing game or singing application where images or graphics include one or more of song lyrics, cues for timing of the song lyrics etc. As such, voice input is detected for at least one of a singing game and singing device. According to embodiments, the voice input is transmitted and/or output to a gaming console to determine accuracy of one or more of the user's timing, pitch and rhythm. In certain embodiments, a controller may receive timing or pitch information to determine feedback.

At block 215, process 200 may include receiving one or more of control and feedback from a gaming console regarding the user voice input. Feedback may be generated during a game or singing session such that feedback is provided to a user during playback or presentation of a particular song. A controller of the microphone input device may receive feedback from the gaming device including controls or input for activation of one of more feedback elements. According to embodiments, control may include instructions and/or commands to activate a feedback elements. Control and feedback received at block 215 may include duration and intensity for activation of one or more feedback elements. At block 220, a controller of the microphone input device may activate one or more feedback elements.

At block 220, process 200 may include controlling one or more feedback elements (e.g., feedback elements $215_{1-n}$). Control may include activation of at least one of a plurality of feedback elements based on feedback from the gaming device. The controller may activate a plurality of feedback elements of the microphone input device and each feedback element may be activated independently. According to embodiments, feedback may indicate an incorrect pitch, timing or rhythm or duration of a note. For example, at least one of the plurality of feedback elements is activated to indicate an incorrect pitch. For voice input that is too low, the microphone input device may activate a feedback element to indicate that pitch should be raised. Alternatively or in combination, one or more feedback elements may be activated in series, such as from the bottom to the top to indicate raising pitch, or from the top down to indicate lowering of pitch. According to embodiments, at least one of the plurality of feedback elements is activated to indicate at least one of an incorrect rhythm and timing of the voice input. For example one or more feedback elements may be activated one or more time to output a desired rhythm or tempo. Elements may be activated to indicate a change in temp is needed. By controlling feedback elements at block 220, a microphone input device can provide a haptic feedback on the user's success with interactive entertainment, such as a singing game.

According to embodiments, controlling feedback elements at block 220 is a rating of the voice input to at least one of a pitch, rhythm and timing of media of the gaming device. Feedback may be provided based on the voice input comparison to one or more of lyric/word matching, pitch, tone, and timing. Sections of feedback elements may be controlled to provide feedback and cues for different feedback. For example, lower feedback elements may provide cues for beat, while higher elements may signal correctly providing pitch.

According to embodiments, process 200 may include providing cues prior to detection of voice input. Process 200 may optionally include receiving cues at block 206 and optionally include generating cues at block 207. By way of example, a microphone input device may receive a control signal or cue from an interactive entertainment device, such as a gaming console, to provide a user with a cue. Cue generation may assist the user. In a singing game a cue may be generated to assist the user by indicating the correct time to begin singing and/or providing assistance with timing of a voice input. Cues received at block 206 may be for one or more of pitch, timing and rhythm. Cue generation may assist visually impaired and/or sensory impaired users of a device.

Process 200 is described in connection with singing games and voice input. It should be appreciate that a microphone input device according to embodiments and process 200 may be applied to other types of media and games. Process 200 may be employed for receiving input from a controller for one or more forms of interactive entertainment including but not limited to dance games, trigger games and simulations.

FIG. 3 illustrates a device configuration according to one or more embodiments. Device 300 may relate to a microphone input device. Device 300 may be a game controller for singing games or a gaming console controller. Device 300 may be configured to provide feedback to a user by way of one or more feedback elements. According to embodiments, device 300 includes transducer 305, controller 310, and memory 315. Device 300 may also include interface (e.g., Input output (I/O)) 320, and feedback elements $325_{1-n}$. Device 300 may optionally include light elements 330 and one or more motion sensors 335.

Controller 310 may relate to a processor or control device configured to execute one or more operations stored in memory 315, such as processes for communicating with an interactive entertainment device, detecting voice input and controlling feedback elements $325_{1-n}$. Controller 310 may be coupled to transducer 305, memory 315, interface 320, and feedback elements $325_{1-n}$. Memory 315 may be non-transitory memory configured to provide data storage and working memory operations for device 300. Memory 315 may be configured to store computer readable instructions for execution by controller 310 for one or more processes described herein. Interface 320 may be a communications module configured to receive and transmit data relative to device 300.

Transducer 305 of device 300 may be configured to detect voice data (e.g., user voice, etc.). Transducer 305 may be configured output voice data to controller 310. Voice input may be detected by transducer 305 for at least one of a singing game and singing device. Transducer 305 may be one of a dynamic microphone and a condenser microphone. Controller 310 may be configured to detect voice input to the transduce element 305 and communicate the voice input to a gaming device, such as a gaming console or interactive entertainment device.

Device 300 may be configured to receive input and communicate with other devices, such as a gaming system and interactive entertainment device, by way of interface 320. Controller 310 may be configured to receive feedback from the gaming device based on the voice input and control activation of at least one of the plurality of feedback elements $325_{1-n}$ based on feedback from the gaming device. Feedback elements $325_{1-n}$ include haptic transducers configured to vibrate, and wherein the controller is configured to activate each feedback element independently. Vibrations by feedback elements $325_{1-n}$ may be felt by a user holding the microphone input device. According to embodiments, feedback elements $325_{1-n}$ are haptic elements with a ring structure. Control of the feedback elements $325_{1-n}$ may be based on a rating of the voice input to at least one of a pitch, rhythm and timing of media of the gaming device. Controller 310 may activate at least one of feedback elements $325_{1-n}$ indicate an incorrect pitch, incorrect rhythm, and/or incorrect timing of the voice input. Similar to feedback, controller 310 may be configured to receive a cue for at least one of pitch, timing and rhythm from the gaming device. Cues may be used to activate feedback elements $325_{1-n}$ prior to voice detection and to aid a user to know when and how to provide voice input.

Device 300 may include one or more light elements, such as optional light elements 330. Optional light elements may be light emitting diodes (LED) of other lighting elements on the body of a microphone input device, such as the microphone handle. Device 300 may be configured to operate with one or more internal sensors, such as optional motion sensor 335. Optional motion sensor 335 may be configured to detect movement of the microphone input device.

FIG. 3 depicts a device configuration according to embodiments. Device 300 may relate to a microphone input device and gaming input device in general. Device 300 may also include one or more interactive controls that communicate with a base device in general.

Figure 4:
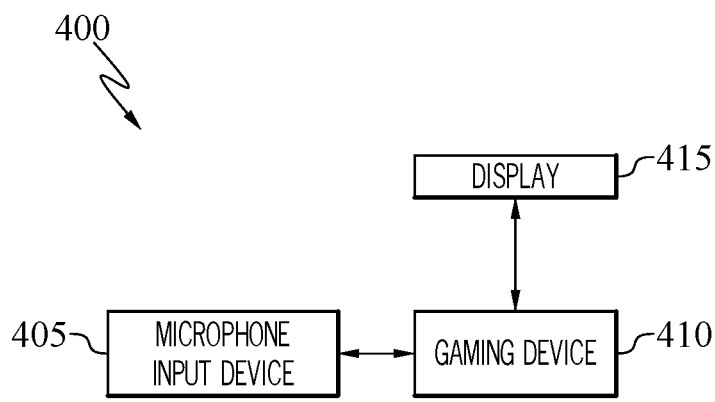
FIG. 4 illustrates a system configuration according to one or more embodiments.

FIG. 4 illustrates a system configuration according to one or more embodiments. System 400 includes microphone input device 405, gaming device 410 and display 415. Microphone input device 405 may be configured to provide voice data to gaming device 410. Gaming device 410 may be one or more of a gaming console, computing device, interactive entertainment device, and electronic device in general configured to output gaming content to display 415. Gaming device 410 may be configured to provide one or more of cues and feedback to microphone input device 405. Gaming device 405 may also be configured to output assistance information to aid a user in interacting with the gaming device and gaming media.

According to embodiments, gaming device 410 is configured to output data and/or content to display 415. Gaming device 410 may relate to a console, media device, and/or handheld device. Gaming device 410 may be configured to present media including singing games and interactive media. Gaming device 410 may be configured to receive gaming media (e.g., card, cartridge, disk, etc.) and output visual and audio content of the gaming media to display 415. According to embodiments, display 415 may be separate from or part of gaming device 410.

According to embodiments, system 400 may use microphone input device as a control or input device for gaming device 405. Unlike entertainment systems that include a microphone, system 400 can control a plurality of feedback elements positioned along a body of microphone input device 405. Microphone input device 405 can include a transducer element, a plurality of feedback elements and a controller. The controller of microphone input device 405 can control the plurality of feedback elements based on feedback from gaming device 410. The controller of microphone input device 405 can detect voice input, communicate voice input to the gaming device 410, and receive feedback for control of the plurality of feedback elements to communicate how well the user is performing. Similarly, the microphone input device 405 may provide haptic feedback in the form of aiding or providing hints for a user. Feedback and haptic output to a user may improve the accessibility of users for gaming devices and singing applications. Microphone input device 405 can include a plurality of feedback elements, such as include haptic transducers positioned along a body of the device. Microphone input device 405 can include elements discussed herein and system 400 may incorporate one or more configurations discussed herein.

Figure 5A:
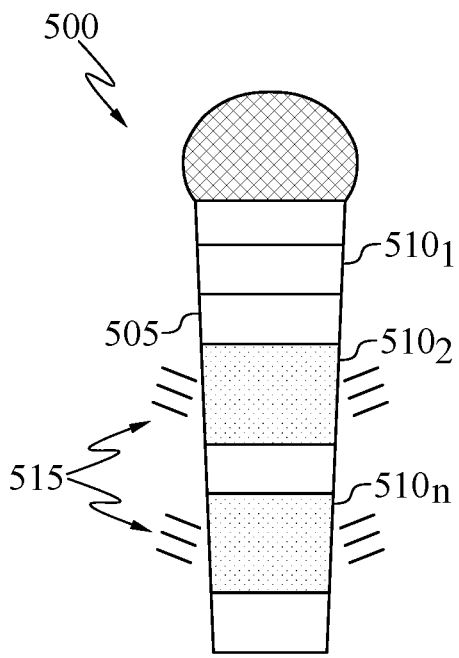
FIGS. 5A-5B illustrate graphical representations of microphone input device activation according to one or more embodiments.
Figure 5B:
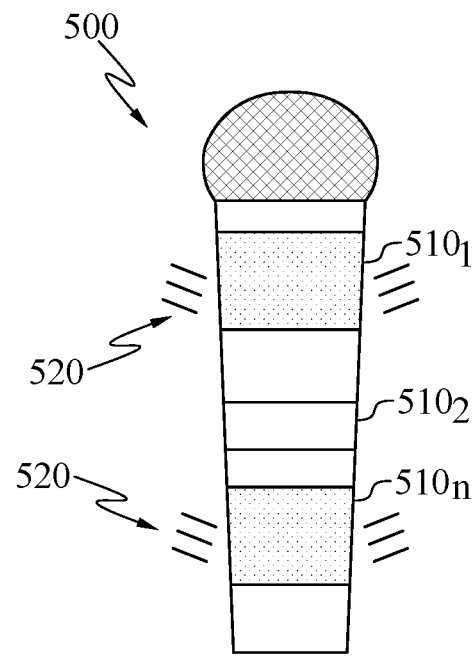

FIGS. 5A-5B illustrate graphical representations of microphone input device and activation according to one or more embodiments. As discussed herein, a microphone input device can include a plurality of feedback element (e.g., feedback elements $115_{1-n}$) configured to provide a haptic output. FIGS. 5A and 5B illustrate microphone input device 500 having body 505 and feedback elements $510_{1-n}$. According to embodiments, microphone input device 500 may be configured to control the activation, duration of activation and intensity of feedback elements $510_{1-n}$. As shown in FIG. 5A, for example, a first configuration example includes activation of feedback elements $510_2$ and $510_n$, while feedback element $510_1$ is not activated. As shown in FIG. 5B, for example, a second configuration example includes activation of feedback elements $510_1$ and $510_n$, while feedback element $510_2$ is not activated. Microphone input device 500 is shown with a plurality of feedback elements and example activation configurations, It should be appreciated that any of the feedback elements $510_{1-n}$ may be activated and controlled independently by a controller of microphone input device 500. It should also be appreciated that additional feedback elements may be included in body 505.

Microphone input device 500 and the exemplary activation configurations can provide feedback and cues to increase accessibility. Microphone input device 500 may be a microphone with haptic feedback to provide users with vision impairment (e.g., legally blind, low vision, etc.) with essential gameplay cues by mimicking the beat of music or increasing/decreasing intensity of vibration based on player performance. Haptic feedback in the microphone input device 500 may also improve the sensory experience of all players who enjoy singing games. Feedback elements of microphone input device 500 may provide visual cues to inform the player how close they match pitch and beat. In addition, microphone input device 500 may provide sensory cues via haptic feedback built into the microphone.

Figure 6:
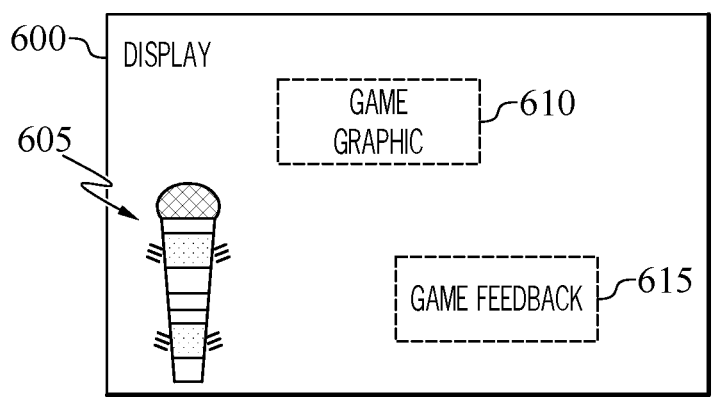
FIG. 6 illustrates a graphical representation of gaming interface according to one or more embodiments.

FIG. 6 illustrates a graphical representation of gaming interface according to one or more embodiments. A microphone input device may allow a user interact with game media that can include audio output and displayed graphical elements. According to embodiments, a user interface for game media may include a display associated with feedback elements of a microphone input device. FIG. 6 illustrates an exemplary game interface presented on display 600. The game interface may include game graphics, such as game graphic 610. Game graphic 610 may include background images, and one or more graphical displays of song lyrics for singing games. According to embodiments game feedback 615 may be displayed to include a graphical representation of a user voice input compared to one or more attributes of a particular song, including, tone, timing and rhythm. According to embodiments, a graphical representation of a microphone input device 605 may be displayed on screen to include an illustration of control or activation. In addition, the graphical representation of a microphone input device 605 may include text or description to provide an explanation of a current activation. In that fashion, a user may be provided with a reference for feedback element activation.

While this disclosure has been particularly shown and described with references to exemplary embodiments thereof, it will be understood by those skilled in the art that various changes in form and details may be made therein without departing from the scope of the claimed embodiments.

What is claimed is:

1. A method for controlling a microphone input device, the method comprising:
   detecting, by a controller of a microphone input device, a voice input to a transducer element of the microphone input device;
   communicating, by the controller, the voice input to a gaming device;
   receiving, by the controller, feedback from the gaming device; and
   controlling, by the controller, activation of at least one of a plurality of feedback elements based on feedback from the gaming device, wherein controlling activation comprises activating two or more feedback elements in series.

2. The method of claim 1, wherein activating two or more feedback elements in series comprises activating two or more feedback elements in a single direction along a body of the microphone input device.

3. The method of claim 2, wherein activating two or more feedback elements in a single direction along the body of the microphone input device comprises activating the two or more feedback elements from bottom to top or top down along the body of the microphone input device.

4. The method of claim 2, wherein the microphone input device comprises a plurality of feedback elements positioned along the body of the microphone input device in a ring structure, and wherein coordinating the activation along a single direction along the body of the microphone input devices comprises activating the two or more feedback elements along the ring structure.

5. The method of claim 1, wherein activating two or more feedback elements in series:
obtaining a rating of the voice input characterizing at least one of a pitch, rhythm, or timing of the voice input;
determining whether the rating satisfies corresponding correctness criteria; and
in response to determining that the rating does not satisfy the corresponding correctness criteria, activating a first feedback element in the two or more feedback elements.

6. The method of claim 1, wherein activating the two or more feedback elements in series comprises activating a set of first feedback elements and at least one set of second feedback elements in series.

7. The method of claim 1, further comprising activating the two or more feedback elements in series a plurality of times.

8. The method of claim 1, wherein activating the two or more feedback elements in series comprises activating a set of first feedback elements and at least one set of second feedback elements in series.

9. The method of claim 1, further comprising:
providing a graphical representation of the microphone input device on a display coupled with the gaming device, wherein the graphical representation of the microphone input device comprises an explanation of the activation of at least one of a plurality of feedback elements.

10. The method of claim 1, wherein controlling activation further comprises:
providing one or more visual cues indicating a measure of closeness of the voice input to pitch and beat, wherein each visual cue corresponds with the activation of the at least one of the plurality of feedback elements.

11. A system comprising one or more computers and one or more storage devices storing instructions that are operable, when executed by the one or more computers, to cause the one or more computers to perform operations comprising:
detecting, by a controller of a microphone input device, a voice input to a transducer element of the microphone input device;
communicating, by the controller, the voice input to a gaming device;
receiving, by the controller, feedback from the gaming device; and
controlling, by the controller, activation of at least one of a plurality of feedback elements based on feedback from the gaming device, wherein controlling activation comprises activating two or more feedback elements in series.

12. The system of claim 11, wherein activating two or more feedback elements in series comprises activating two or more feedback elements in a single direction along a body of the microphone input device.

13. The system of claim 12, wherein activating two or more feedback elements in a single direction along the body of the microphone input device comprises activating the two or more feedback elements from bottom to top or top down along the body of the microphone input device.

14. The system of claim 12, wherein the microphone input device comprises a plurality of feedback elements positioned along the body of the microphone input device in a ring structure, and wherein coordinating the activation along a single direction along the body of the microphone input devices comprises activating the two or more feedback elements along the ring structure.

15. The system of claim 11, wherein activating two or more feedback elements in series:
obtaining a rating of the voice input characterizing at least one of a pitch, rhythm, or timing of the voice input;
determining whether the rating satisfies corresponding correctness criteria; and
in response to determining that the rating does not satisfy the corresponding correctness criteria, activating a first feedback element in the two or more feedback elements.

16. A non-transitory computer storage medium encoded with a computer program, the program comprising instructions that are operable, when executed by data processing apparatus, to cause the data processing apparatus to perform operations comprising:
detecting, by a controller of a microphone input device, a voice input to a transducer element of the microphone input device;
communicating, by the controller, the voice input to a gaming device;
receiving, by the controller, feedback from the gaming device; and
controlling, by the controller, activation of at least one of a plurality of feedback elements based on feedback from the gaming device, wherein controlling activation comprises activating two or more feedback elements in series.

17. The non-transitory computer storage medium of claim 16, wherein activating two or more feedback elements in series comprises activating two or more feedback elements in a single direction along a body of the microphone input device.

18. The non-transitory computer storage medium of claim 17, wherein activating two or more feedback elements in a single direction along the body of the microphone input device comprises activating the two or more feedback elements from bottom to top or top down along the body of the microphone input device.

19. The non-transitory computer storage medium of claim 17, wherein the microphone input device comprises a plurality of feedback elements positioned along the body of the microphone input device in a ring structure, and wherein coordinating the activation along a single direction along the body of the microphone input devices comprises activating the two or more feedback elements along the ring structure.

20. The non-transitory computer storage medium of claim 16, wherein activating two or more feedback elements in series:
obtaining a rating of the voice input characterizing at least one of a pitch, rhythm, or timing of the voice input;
determining whether the rating satisfies corresponding correctness criteria; and in response to determining that the rating does not satisfy the corresponding correctness criteria, activating a first feedback element in the two or more feedback elements.

\* \* \* \* \*